Figure 1:
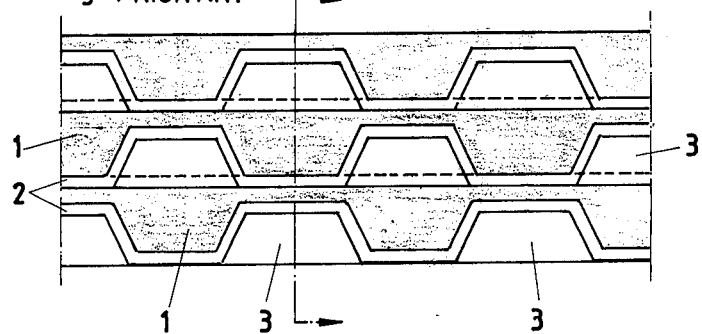

United States Patent [19]

Almqvist et al.

[11] 4,284,135
[45] Aug. 18, 1981

[54] DEVICE FOR MUTUALLY FIXING PLATE ELEMENTS OF PLATE HEAT EXCHANGERS OR PLATE FILTERS

[75] Inventors: Christer Almqvist, Täby; Lars Lindahl, Handen, both of Sweden

[73] Assignee: ReHeat AB, Täby, Sweden

[21] Appl. No.: 123,815

[22] Filed: Feb. 22, 1980

[30] Foreign Application Priority Data

Aug. 31, 1978 [SE] Sweden ............................. 7809204

[51] Int. Cl.³ ..................................... F28F 3/10
[52] U.S. Cl. ................................. 165/166; 55/443; 55/446
[58] Field of Search ........................ 165/166, 167; 55/442-446

[56] References Cited

U.S. PATENT DOCUMENTS 2,281,754  5/1942  Dalzell .................................. 165/167

FOREIGN PATENT DOCUMENTS

| 89288 | 9/1960 | Denmark | 165/166 |
| 866349 | 2/1953 | Fed. Rep. of Germany | 165/166 |
| 165960 | 1/1959 | Sweden . | |
| 208901 | 11/1966 | Sweden | 165/167 |
| 766211 | 1/1957 | United Kingdom | 165/166 |
| 1020045 | 2/1966 | United Kingdom | 165/167 |

Primary Examiner—Sheldon J. Richter
Attorney, Agent, or Firm—Cushman, Darby, & Cushman

[57] ABSTRACT

The gasket grooves of plate elements are disposed in an intermediate plane. The gasket then will abut the distance members of both adjacent plate elements in its own gasket groove and parts of the respective distance members. The plate elements are fixed relative to each other when the plate elements are clamped together. The gaskets act as guide strips.

1 Claim, 8 Drawing Figures

U.S. Patent  Aug. 18, 1981  4,284,135

DEVICE FOR MUTUALLY FIXING PLATE ELEMENTS OF PLATE HEAT EXCHANGERS OR PLATE FILTERS

This invention relates to a device for fixing plate elements of plate heat exchangers or plate filters relative to each other.

Heretofore, the plate elements in a plate heat exchanger or plate filter have been fixed and guided only by the carrying axles and beams in the heat exchanger or filter stands. Originally the carrying axles usually had circular cross-section, so that there was a relatively large abutment between the carrying axle and the plate element recess corresponding to the axle, which abutment yielded a relatively good fixing of the plate elements. The trend has been toward larger, and thereby heavier plate elements as well as to an increasing number of plate elements comprised in each plate heat exchanger and plate filter. The requirements on the surface inertia moment of the carrying beams consequently have increased, and in the majority of cases the circular carrying axles have been abandoned. The plate elements normally are suspended on the upper carrying beam and guided by the upper and the lower carrying axle. In order to increase the surface inertia moment of the upper carrying beam, the beam normally is given I- or ⊥-shape. At such structural design, the plate elements are suspended on the lower flange of the upper beam. For being able to easily suspend the plate elements on said flange and to easily release them therefrom, the recesses in the plate elements must be formed so as to overlap the flange of the carrying beam to a limited extent. Hereby the abutment surface between the carrying beam and the plate element is reduced, and the fixing of the plate elements is deteriorated. In order to compensate for the reduced abutment surface between the supporting beam and the plate element, the edge of the recess in the plate element usually is reinforced by a metal sheet spot-welded on the plate element.

The plate elements are provided with gaskets, which guide the medium flow and seal the channels between the plate elements. On each plate element an entire gasket, or field and ring gaskets are secured by glueing in special gasket grooves. The surface of the plate element which is provided with the glued gasket, usually is called the front side of the element. The gasket or gaskets seal against adjacent plate elements, the rear surface of which is formed as a sealing surface. For effecting sealing, the gaskets are compressed in that the plate elements are clamped together between two end walls of the stand. The gasket material normally is an elastomer. Elastomer gaskets are compressed between 20 and 40% in order to obtain a gasket pressure ensuring efficient sealing. When the plate elements are clamped together for compressing the gaskets, the plate elements are moved along the carrying beams. The gasket pressures are high, and consequently also the forces are high, particularly at the end of the clamping movement of the plate elements. These forces on the plate package between the end walls can give rise to relatively strong lateral forces on individual plate elements, so that the plate elements when fixed poorly on the carrying beam can slide laterally relative to each other. The gaskets and the sealing surfaces of the plate elements then do not longer abut each other, and leakage occurs.

A release agent, for example silicone oil, usually is applied on the sealing surface of the plate elements in order to prevent the gaskets from adhering to adjacent plate elements and, thus, are able to disengage when the plate heat exchanger or plate filter is opened, for example for cleaning. The release agent on the sealing surface substantially reduces the friction between the gaskets and the sealing surfaces, i.e. between the plate elements. This implies that a large part of the lateral force is not taken up by the friction between the plate elements, but only by the recesses in the plate elements, in which the elements are guided and fixed by the carrying beams.

In order to prevent the lateral forces from moving plate elements in lateral direction, the abutment surface of the recesses of the plate elements for the carrying beams is reinforced by bracings. A better solution is to provide the plate elements relative each other with fixing means, so that the plate elements mutually fix each other. This can be achieved by providing the plate elements with elevated and countersunk members, which engage with corresponding members of the adjacent plate element. However, there is very limited space on the plate element for arranging such fixing members without affecting the functioning of the plate element. In order to satisfactorily fix the plate elements relative to each other by fixing members, it is necessary to allocate a special surface for these fixing members. This requires an increase in the surface and the material of the plate elements. The present invention relates to a fixing device of plate elements relative to each other which does not require a special surface of the plate element for this purpose. According to the invention, the gasket grooves in the plate elements are disposed in an intermediate plane, so that the gaskets in lateral direction abut distance members of the adjacent plate element. Hereby, the plate elements are fixed relative to each other in a very great number of points thereon and so, that the gaskets act as guide strips. The previous sealing functions of the gaskets, gasket grooves and sealing surfaces remain unchanged.

Figure 2:
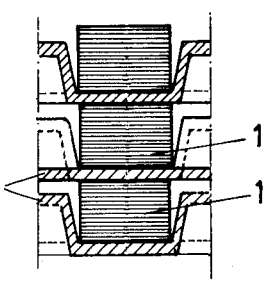
Figure 3:
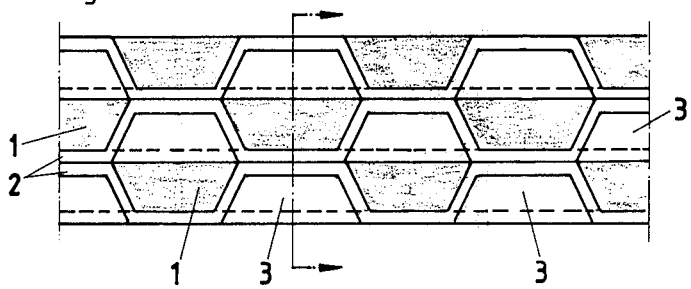
Figure 4:
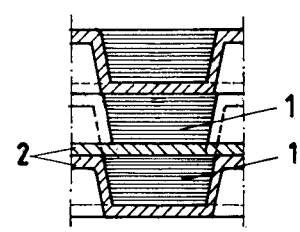
Figure 5:
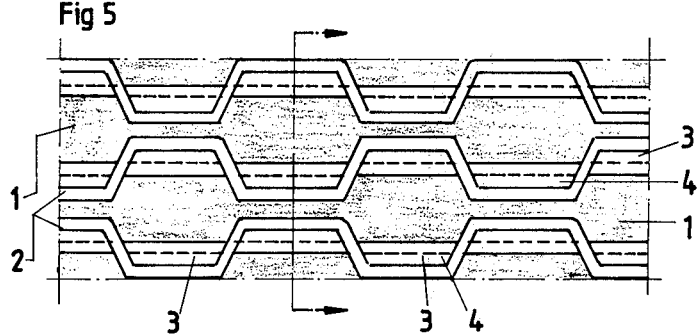
Figure 6:
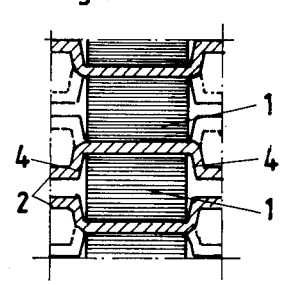
Figure 7:
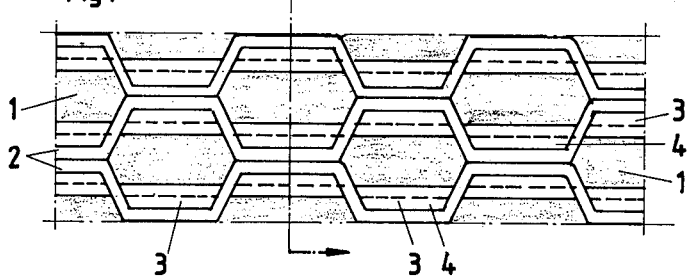
Figure 8:
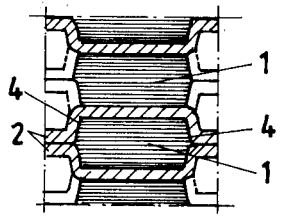

The invention is described in greater detail in the following, with reference to the accompanying drawing, in which identical details in the different Figures are designated by the same reference numbers, and in which FIG. 1 is a lateral section of plate elements in a plate assembly according to a known pattern, prior to the compression of the gasket in a plate heat exchanger or plate filter, where the gasket groove is located in the lower plane of the plate element, FIG. 2 is a section of FIG. 1, FIG. 3 is a lateral section corresponding to FIG. 1, but with the gasket compressed, FIG. 4 is a section of FIG. 3, FIG. 5 is a lateral section corresponding to FIG. 1, with a gasket groove according to the invention, FIG. 6 is a section of FIG. 5, FIG. 7 is a lateral section according to FIG. 5, with the gasket compressed, and FIG. 8 is a section of FIG. 7.

FIG. 1 shows a conventional embodiment according to SE-PS 165960 of gasket grooves in plate elements seen from the side of the plate assembly. The gasket 1 is secured by glueing in a groove in the upper surface of the plate element. Said groove is surrounded by distancing projections, distance members 3, which constitute supports for the gasket 1 glued on the plate element 2.

FIG. 2 is a section of the gasket 1 in the gasket groove, which is located so as to coincide with the lower plane of the plate element. The gasket seals against a sealing surface on the adjacent plate element, which surface is the plane rear side of the gasket groove. Upon compressing the gasket 1, the gasket has no support from the distance member of the adjacent plate element.

FIG. 3 shows plate elements with gaskets in clamped-together state and with the gasket compressed. When the plate elements are clamped together, the distance members prevent the gasket from being pressed out of its position, in which it is intended to seal against the plate elements. FIG. 4 is a section of FIG. 3.

FIG. 5 is a lateral section of the plate assembly consisting of plate elements, of which the gaskets not yet compressed abut adjacent plate elements.

Compared with the embodiment according to FIGS. 1 to 4, the position of the gasket groove in FIG. 5 is offset relative to the lower plane of the plate element. At a possible lateral movement of the plate elements, the gasket then will abut both the distance members in its own gasket groove and parts of distance members of adjacent plate elements. These vertical abutment surfaces 4, which are distributed over the entire plate element along the gasket, act together with the gasket for fixing the plate elements relative to another when the plate elements are clamped together.

FIG. 6 is a section of FIG. 5.

FIG. 7 is a lateral section corresponding to FIG. 5 where the plate elements are completely clamped together, and the gasket is compressed for its sealing function. As shown in FIG. 8, the gasket in compressed state completely abuts the abutment surfaces 4 of the distance members of adjacent plate elements. The fixing capacity, thus, is increased with increased compression of the gaskets, which is a great advantage as the forces in the plate assembly also increase with the compression when the assembly is clamped together.

The afore-mentioned fixing device between plate elements holds the plate elements in definite positions, so that the plate elements cannot be displaced relative each other and cause leakage. The gasket groove preferably should be located in a neutral plane of the plate elements, i.e. centrally between the lower and the upper plane of the plate elements, but, of course, it also may have a different location relative to the lower plane within the scope of the invention idea defined in the attached claim.

What we claim is:

1. A plate element at plate heat exchanger or plate filter assembled of several such plate elements, each plate element provided with distance members embossed in the plate substantially in the form of corrugations, which distance members of two adjacent plates intersect one another, characterized in that the gasket groove known per se for receiving a gasket located between the plates and extending about the plate is embossed with its bottom extending in a plane located approximately centrally between the tops of two adjacent distance members directed to opposed sides of the plate, and that each distance member terminating in the gasket groove shows toward the same a surface, the height of which corresponds approximately to half the total thickness of the plate, which surfaces at the mounting of the plates form supporting surfaces in lateral direction for the gasket.

* * * * *